United States Patent
Potok

(10) Patent No.: US 7,454,790 B2
(45) Date of Patent: Nov. 18, 2008

(54) METHOD FOR DETECTING SOPHISTICATED CYBER ATTACKS

(75) Inventor: Thomas E. Potok, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 801 days.

(21) Appl. No.: 11/135,147

(22) Filed: May 23, 2005

(65) Prior Publication Data

US 2006/0265748 A1    Nov. 23, 2006

(51) Int. Cl.
G06F 21/00 (2006.01)
(52) U.S. Cl. ........................................................ 726/23
(58) Field of Classification Search .................... 726/23
See application file for complete search history.

(56) References Cited

U.S. PATENT DOCUMENTS

| | | | |
|---|---|---|---|
| 6,134,664 A | 10/2000 | Walker | |
| 7,017,186 B2* | 3/2006 | Day | 726/23 |
| 7,143,442 B2* | 11/2006 | Scarfe et al. | 726/23 |
| 2003/0120639 A1 | 6/2003 | Potok et al. | |
| 2003/0236652 A1 | 12/2003 | Scherrer et al. | |
| 2004/0024864 A1* | 2/2004 | Porras et al. | 709/224 |

OTHER PUBLICATIONS

Liao et al., "Using Text Categorization Techniques for Intrusion Detection", USENIX, Aug. 2002, Retrieved from the Internet on Sep. 19, 2008: <URL: http://www.usenix.org/publications/library/proceedings/sec02/full_papers/liao/liao.pdf>.*
Tolle et al., "Supporting Intrusion Detection by Graph Clustering and Graph Drawing", 2000, Retrieved from the Internet on Sep. 19, 2008: <URL: http://www.raid-symposium.org/raid2000/Materials/Abstracts/22/22.pdf>.*
Wang et al., "A Clustering Algorithm for Intrusion Detection", Apr. 2005, Retrieved from the Internet on Sep. 19, 2008: <URL: http://spiedl.aip.org/getabs/servlet/GetabsServlet?prog=normal&id=PSISDG005812000001000031000001&idtype=cvips>.*
S.K.M. Wong, et al., "On Modeling of Information Retrieval Concepts in Vector Spaces," ACM Transactions on Database Systems, 1987, pp. 299-321, vol. 12, No. 2.
A.K. Jain, et al., "Data Clustering: A Review," ACM Computing Surveys, 1999, pp. 264-323, vol. 31, No. 3.

* cited by examiner

Primary Examiner—Gilberto Barron, Jr.
Assistant Examiner—Minh Dinh
(74) Attorney, Agent, or Firm—Joseph A. Marasco; James M. Spicer

(57) ABSTRACT

A method of analyzing computer intrusion detection information that looks beyond known attacks and abnormal access patterns to the critical information that an intruder may want to access. Unique target identifiers and type of work performed by the networked targets is added to audit log records. Analysis using vector space modeling, dissimilarity matrix comparison, and clustering of the event records is then performed.

4 Claims, 6 Drawing Sheets

From: Raw Log Entry

[]misc-000264 ID247 - MISC - Large UDP Packet []
07/20-00:05:03.171193 0:90:69:9dB0:3E ->0:3:6C:42:53:FC type:0x800 len:0x527
63.76.192.107:23882-> 160.91.64.211:6970 UDP TTL:119 TOS: 0x0 ID:60713
Len: 1285

To: Parsed Log Entry

| | |
|---|---|
| Filter: | misc-000264 IDS247 - MISC - Large UDP Packet |
| Date: | 07/20 |
| TOD: | 00:05:03.171193 |
| Source IP: | 63.76.192.107 |
| Source Port: | 23882 |
| Target IP: | 160.91.64.211 |
| Target Port: | 6970 |
| Length: | 1285 |

Fig. 2

Textual Clustering

| | Doc 1 | Doc 2 | Doc 3 |
|---|---|---|---|
| Ping | 1 | 0 | 0 |
| Buffer | 1 | 1 | 1 |
| 193.323.157.034 | 1 | 1 | 0 |
| Arnold Wilson | 1 | 0 | 0 |
| Nuclear | 1 | 0 | 0 |
| www.ping.com | 1 | 0 | 0 |
| Explosive | 1 | 0 | 1 |
| Login | 1 | 0 | 1 |
| ORNL | 0 | 1 | 0 |
| Overflow | 0 | 1 | 1 |
| 192.233.252.178 | 0 | 1 | 1 |
| Defense | 0 | 1 | 1 |
| Jane Smith | 0 | 0 | 1 |
| contract | 0 | 0 | 1 |

Vector Space Model
*Words to Documents*

| | Doc 1 | Doc 2 | Doc 3 |
|---|---|---|---|
| Doc 1 | 100% | 17% | 21% |
| Doc 2 | | 100% | 36% |
| Doc 3 | | | 100% |

Dissimilarity Matrix
*Documents to Documents*

Cluster Analysis
*Most Similar Documents*

Results: All attacks

Failed login errors highlighted

SNORT log entries from 788 source IPs

Suspicious Patterns

Failed Login

Search over curious PI name

Both PI's work in the same nanoscience area

45 Entries from:
— Czech Republic, Austria, Hungry, Latvia, France, Chile, and Canada.

Potential Attack

Source IP: 195.77.189.2 cerbero.marmedsa.com

| Date | Time | Source Port | Destination IP | Destination Hostname | PI Name | Research Area | Destination Port | Length | Filter |
|---|---|---|---|---|---|---|---|---|---|
| 07/23 | 13:15 | 80 | 128.219.49.130 | LQ32.CT.ORNL.GOV | HIDDEN | Chemical and Material Science on Nanostructured Surfaces: Biomimetic Photosyn | 3295 | 280 | beta-000014 BETA - WEB - 403 Forbidden |
| 07/23 | 13:36 | 80 | 128.219.49.130 | LQ32.CT.ORNL.GOV | HIDDEN | Chemical and Material Science on Nanostructured Surfaces: Biomimetic Photosyn | 3902 | 280 | beta-000014 BETA - WEB - 403 Forbidden |

Source IP: 200.10.225.87 ncache07.terra.cl

| Date | Time | Source Port | Destination IP | Destination Hostname | PI Name | Research Area | Destination Port | Length | Filter |
|---|---|---|---|---|---|---|---|---|---|
| 07/23 | 14:14 | 80 | 128.219.49.130 | LQ32.CT.ORNL.GOV | HIDDEN | Chemical and Material Science on Nanostructured Surfaces: Biomimetic Photosyn | 4145 | 455 | beta-000014 BETA - WEB - 403 Forbidden |
| 07/23 | 14:29 | 80 | 128.219.49.130 | LQ32.CT.ORNL.GOV | HIDDEN | Chemical and Material Science on Nanostructured Surfaces: Biomimetic Photosyn | 4302 | 455 | beta-000014 BETA - WEB - 403 Forbidden |

Fig. 6

METHOD FOR DETECTING SOPHISTICATED CYBER ATTACKS

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

BACKGROUND OF THE INVENTION

1. Field of Invention

The invention relates to methods for detecting unwanted intrusions into computer networks. More particularly, data pertaining to targeted internet protocol addresses in a network are compared to data from the IP addresses of possible intruders using a vector space model, compared in a dissimilarity matrix, and clustered for subsequent analysis.

2. Description of Prior Art

A great deal of very sensitive information resides in computer networks. This information ranges from personal credit card information to nuclear weapons design. Typically, such information is heavily protected and highly sought after by various illicit groups. These groups use a wide variety of means to gain access to this sensitive data.

Firewall blocking is generally the first preventive measure in guarding against cyber attacks. In addition to firewall blocking, misuse detection and anomaly detection are also used. In the following description, the person or computer in the network being attacked is referred to as the target or destination, and the intruder or attacking computer that attempts to remain undetected is referred to as the source.

Misuse Detection

Misuse detection relies on identifying patterns of misuse that can be abstracted into signatures. The signatures are used to identify and prevent future attacks that follow these known patterns. Network activity logging software, for example, typically resides outside the firewall, and is capable of providing a trail of an attacker's activities. The audit log may show a surge of unsuccessful access attempts on a number of computers in a network. These access attempts are often characterized by a sequential series of steps through ports and internet protocol (IP) addresses. Since this activity is clearly visible in the audit log activity, intrusion detection software can easily detect it as unauthorized network access attempts by one or more attackers. In fact, most firewalls can also detect and prevent this type of access. Additionally, they may simply block certain events identified by the audit log software.

Pinging is one example of a signature attack. Pinging refers to sending a very short signal to an IP address. A return acknowledgement signal is received from the IP address. It serves to establish that the connection between the two computers is good. Pinging is one way to potentially attack a network of computers. The attacker will know which computers respond, and from that, will begin to characterize what the network looks like. For this reason, pinging is flagged as a possible intrusion by an attacker.

Another type of signature attack is the sending of large packets of computer code. A packet that is over a certain size may overflow the area it is supposed to be in. In this way, an intruder may put malicious code in a computer, knowing the code will be executed under certain conditions.

The limitations of misuse detection are that new types of attack may not be recognized using existing signatures, signatures may not be expressive enough to cover all aspects of known attacks, and the false positives rate is very high. While pattern detection is a very valuable line of defense, its limitations clearly require additional protection. This has led to anomaly detection, where deviation from normal user behavior is flagged as a potential attack.

Anomaly Detection

A more sophisticated attacker will use new and unknown attack patterns to gain access to a host computer or network. The attack may be carried out by one or many attackers from different computers. Although the attack will typically not be recognized as a known technique, it may register as abnormal activity. By characterizing normal network activity, activities outside of normal can be detected and evaluated to determine if a new type of attack has occurred. An activity may be deemed abnormal if, for example, there are unusually high access frequencies, high volumes of data entering or leaving the network, or unusual times for network activity. A variety of anomaly detection techniques exist to identify these types of attacks.

The limitations of anomaly detection include missing attacks that fall outside of normal access patterns and determining whether the attack is malicious or non-malicious. Once an anomaly has been detected, there is still a great deal of work to do to establish that it is indeed an attack. This approach has been shown to be able to detect new types of network attacks.

Sophisticated Attacks

More sophisticated attackers attempt to use concealed techniques to gain access to computer networks and protected information. They understand how intrusion detection and firewall software work, and use methods that will not trigger misuse filters or anomaly detectors. The sophisticated user is typically looking for a key piece of information, not just access to the network. A key motivation is to gain the specific information but leave no evidence of the intrusion. The information may be a detail in the design of a nuclear weapon or the spending patterns of a corporate or government executive. These attackers may rely in part on information gathered from public sources such as the publication record of scientists in key areas, or from "social engineering" where a group of unsuspecting people provide information that in total allows access to a network.

In addition, a legitimate network user may wittingly or unwittingly provides access to a host computer. Once access is gained, the attacker follows normal access patterns, operates during normal business hours, and limits transactions to normal volumes. Attempts to access information may be done from multiple computers and different domains. A small number of attempts will be made from each computer per day, and insider information will usually be used to attack the computers or network. It is difficult to prevent this type of "low and slow" attack, and even to recognize when it occurs.

The present invention builds on the fact that audit logs alone do not provide enough information to detect these more highly sophisticated types of attack that compromise a network. The invention is based on knowing who owns the highly sensitive information in a network, and determining who is attempting to access this information. The invention looks beyond known attack signatures and abnormal access patterns to the locations and owners of critical information that an intruder may want to access.

REFERENCES

1. U.S. Pat. No. 6,134,664, issued Oct. 17, 2000, J. H. Walker.
2. U.S. Patent Application Publication No. US 2003/0120639 A1, published Jun. 6, 2003, T. E. Potok, M. T. Elmore, J. W. Reed, J. N. Treadwell and N. F. Samatova.
3. U.S. Patent Application Publication No. US 2003/0236652 A1, published Dec. 25, 2003, C. Scherrer and B. Woodworth.
4. S. K. M. Wong, W. Ziarko, V. V. Raghavan, and P. C. N. Wong, "On Modeling of Information Retrieval Concepts in Vector Spaces," in ACM Transactions on Database Systems, vol. 12, No. 2, pp. 299-321, 1987.
5. A. K. Jain, M. N. Murty, and P. J. Flynn, "Data Clustering: a Review," in ACM Computing Surveys, vol. 31, no. 3, pp. 264-323, 1999.

BRIEF SUMMARY OF THE INVENTION

In a preferred embodiment, a method of detecting cyber attacks upon networked targets by potential intruders comprises the steps of organizing audit log data into event records, adding unique target identifiers to the event records, adding the type of work performed by the networked targets to the event records, sorting the event records by the IP addresses of potential intruders, generating intruder records of the potential intruders of target IP addresses that were accessed, generating a vector space model of the event records, generating a dissimilarity matrix of the data and IP addresses in the event records, and clustering event records from the dissimilarity matrix that contain a selected event.

BRIEF DESCRIPTION OF THE DRAWINGS

FIG. 2 illustrates sample data typically available from commercial audit log software.

FIG. 6 is a listing of actual event record data corresponding to the cluster analysis results of FIG. 5.

DETAILED DESCRIPTION OF THE INVENTION

The following information having to do with a group of networked computers is assumed to be readily available, either from network audit log records or obtainable from databases within the targeted organization:
  a) Network audit log records that are up to date and contain records of all actual and failed log-on events. Included are all the intrusion events, the time the events occurred, and the intruder IP addresses associated with targeted IP addresses.
  b) Network registration information that relates a person to an IP address.
  c) Job classification information that relates the person to a specific job, function or area of expertise within the organization.

Network audit log software resides outside the network firewall so that any incoming packet that is suspect, i.e., triggers a flag, gets set aside without reaching the net of computers. In a large networked computer system, there may be a million such records that get set aside each day. A typical network audit log software program is SNORT, available as open source from www.snort.org.

Figure 1:
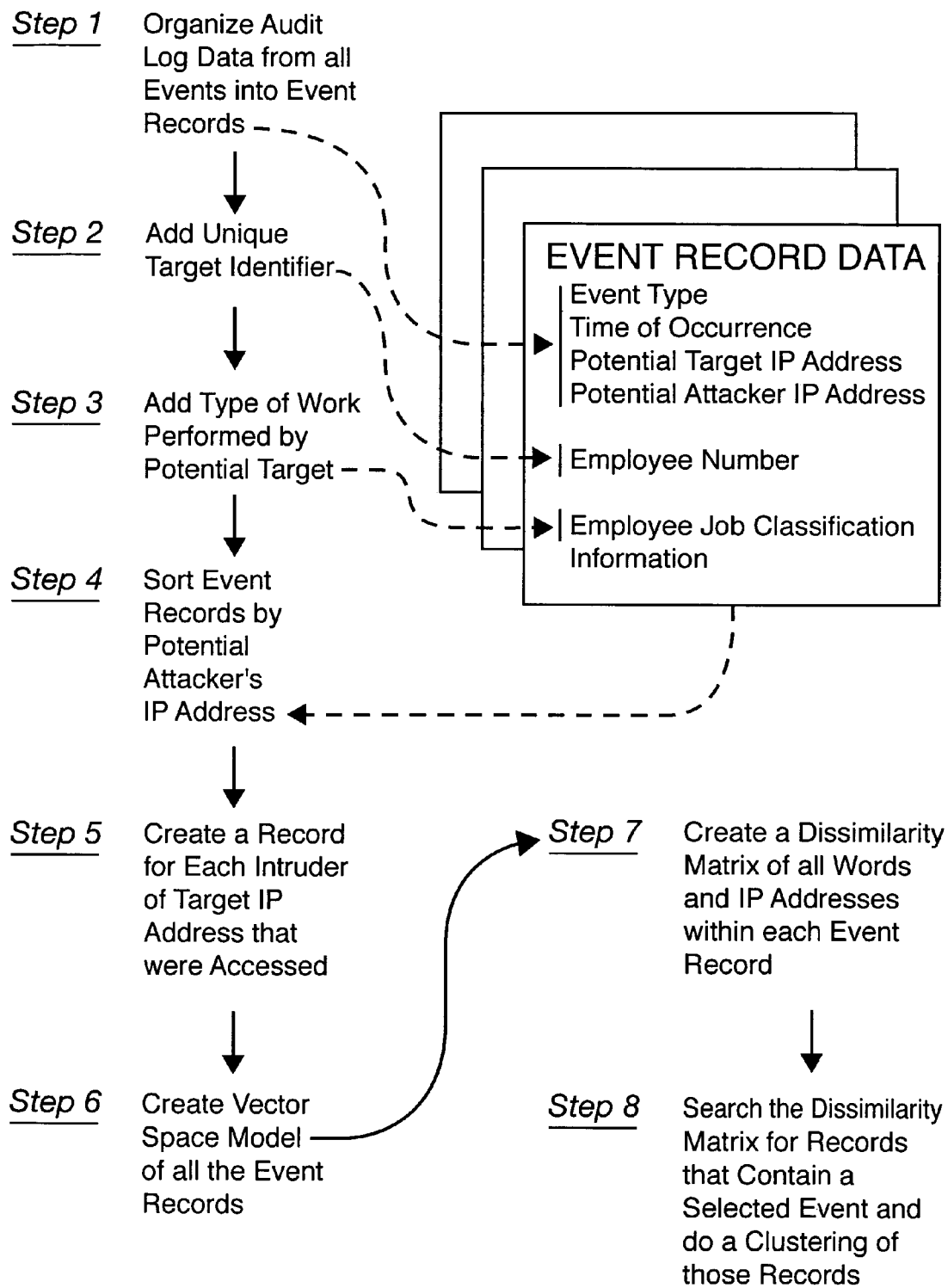
FIG. 1 is a diagram of the method for detecting sophisticated cyber attacks according to the present invention.

The method for detecting sophisticated cyber attacks is shown in FIG. 1, and involves the following process steps.

Step 1. Organize attack event data from the audit log records into event records. Step 1 involves determining at least the following information from each entry in a network audit log:
  a) The characterization of the event type, i.e., ping, failed logon, large packet, etc,
  b) The time the event occurred,
  c) The IP address of the potential target, and
  d) The IP address of the potential intruder.

The event type represents any one of a number of recognizable possible attack types. The presence of the event type is an indication that some filter triggered at the occurrence of an event of interest to the intrusion detection system. The data extracted from the audit log includes two important pieces of information, the source IP address and the target IP address. The source IP address identifies the computer the intrusion came from, and the target IP address identifies the networked computer under possible attack. FIG. 2 shows some of the data fields that may be copied from the audit log for each event and put in memory as a single event record.

With the audit log records sorted based on the sources and targets the sources were going to, the records are augmented with certain crucial information.

Step 2. Add a unique target identifier such as an employee number to the event records. In FIG. 1, step 2 involves using the target IP address to uniquely identify the potential victim of the attack. Here, employee numbers or other unique employee identification information is associated with the targeted IP addresses in the event records. The employee number information can typically be found in a network registration database. For example, the database may show IP Address 222.222.222.222 is registered to the person named "John Doe" who has employee number "12345".

Step 3. Add the type of work performed by the potential victim to the event records. In Step 3, the target job description is found by cross-referencing the employee number or other unique identification with that person's job classification information. For example, "John Doe" has the job title of "nuclear physicist." Like the employee number, the job classification information may be located in a separate database such as a personnel or job position database. For example, in this step, the research area and employee number of the targeted person may be associated with the event records. In a different example, the targeted person may be a principal investigator in a particularly sensitive research project, and this information would be linked to the event records.

With such data associations made, it becomes possible to view all the past activity of a particular intruder. It may be discovered, for example, that in coming against a particular target, a potential attacker may have had four or five packets flagged as something being wrong with them. Also, it is possible to view all attempted entries into a particular scientist's computer in a given time frame.

Step 4. Sort the event records by a potential intruder's IP address. If the potential intruder's IP address is 444.444.444.444, then every entry in the log for this address for a given time period is found.

In Step 4, some information about the potential intruder begins to emerge, although it is still very sketchy. To generalize this step, all the activities of a source attacker directed against a specific targeted person and/or that person's job responsibilities are found. Thus, instead of looking at the network from a global scale, only the targeted computers (people) having the most sensitive information are selected for examination and/or further surveillance.

Step 5. Create a record for each intruder. This step involves generating a record for each intruder that includes the intruder's IP address and a list of the target IP addresses that were accessed. The record includes at least the registered owner of the IP address, what type of work the person does, when the potential attack occurred, and what type of event was flagged.

Step 5 pulls together all the activities an intruder (one source IP) is engaged in while attempting to connect to computers within the network. Information including the date, time, target (destination IP), host computer name, principal investigator's name, research area the principal investigator is working in, destination port link and why it was flagged may all be included in this step. A record such as this can be readily generated for each access attempt made on the network by any given potential attacker.

Step 6. Create a vector space model (VSM) of all of the event records. This allows for rapid searching over the records in subsequent steps.

The VSM is well documented in the open literature with respect to document comparison. (See, for example, S. K. M. Wong et al, Ref. 4.) In this description, each event record, including all the attack event records, will be understood as "documents" in VSM terminology. Likewise, the individual data that make up each attack event such as the potential intruder's IP address, event date, time, target (destination IP), host computer name, principal investigator's name, research area the principal investigator is working in, destination port link, etc will be understood as "words" in VSM terminology.

Figure 3:
FIG. 3 illustrates a vector space model of event record data, a dissimilarity matrix comparison of the vector space model data, and a cluster analysis of the dissimilarity matrix comparison data.
Figure 3:
Figure 3:
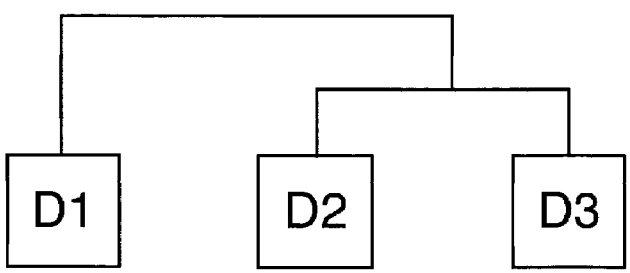

With reference to FIG. 3, the words within an individual event record or document are used to generate a vector that represents the document. A set of these document vectors is used to generate a vector space model (VSM) that represents the relationships between the words and documents. In a VSM, each unique word within a document collection is represented as a dimension in space, and each document is represented by a vector in that multidimensional space. The numeric representation of a word within a specific document (which is a single element of the document's vector and a single dimension in the VSM) is typically based on the frequency of the word within the document (local term frequency), and the frequency within the document set (global term frequency). A word with a high frequency within a specific document and low frequency within a set of documents produces a high value. Words with high values have been shown to be very useful in accurately classifying and retrieving documents. Since a word frequency over a set of documents is required, all documents within a set must be analyzed before a VSM can be constructed.

Step 7. Generate a dissimilarity matrix to relate one record to another record. FIG. 3 illustrates the dissimilarity comparison which involves comparing the vector space model for each record against the vector space model of every other record. The dissimilarity matrix is based on the similarity of the words and IP addresses within each event record. Step 7 may also be understood from the open literature with respect to document comparison. (See, for example, A. K. Jain et al, Ref. 5.)

The vector space model can thus be used to define a dissimilarity value between a pair of documents. Typically, this value is obtained by using the Euclidian distance between the vector endpoints or using the dot product to calculate the cosine of the angle between the pair of document vectors. All of the possible pairs of documents in the collection can be compared and their dissimilarity values collected to generate the dissimilarity matrix.

Step 8. Search the dissimilarity matrix for records that contain a selected event. This step, also illustrated in FIG. 3, involves selecting an event type from the dissimilarity matrix that signals a potential attack, for example, a "failed logon". A clustering of the records that contain the selected event is then carried out. A. K. Jain et al (Ref. 5) gives a general description of the clustering step in document-to-document comparison.

The dissimilarity matrix is needed to compute the document clusters. The agglomerative clustering process begins by placing each document within its own cluster. Next, the pair of clusters that contain the most similar documents (as defined by the dissimilarity matrix) are merged into a single cluster. At this point, the dissimilarity matrix values must be updated to reflect the merge. This process iterates until all of the documents are in a single cluster. The computer method described in T. E. Potok et al (Ref. 2) is one tool that can be utilized to carry out the clustering process.

When the clustering step is completed, the user simply reviews the cluster manually, looking for patterns in the cluster which may indicate suspicious or anomalous behavior.

EXAMPLES

Figure 4:
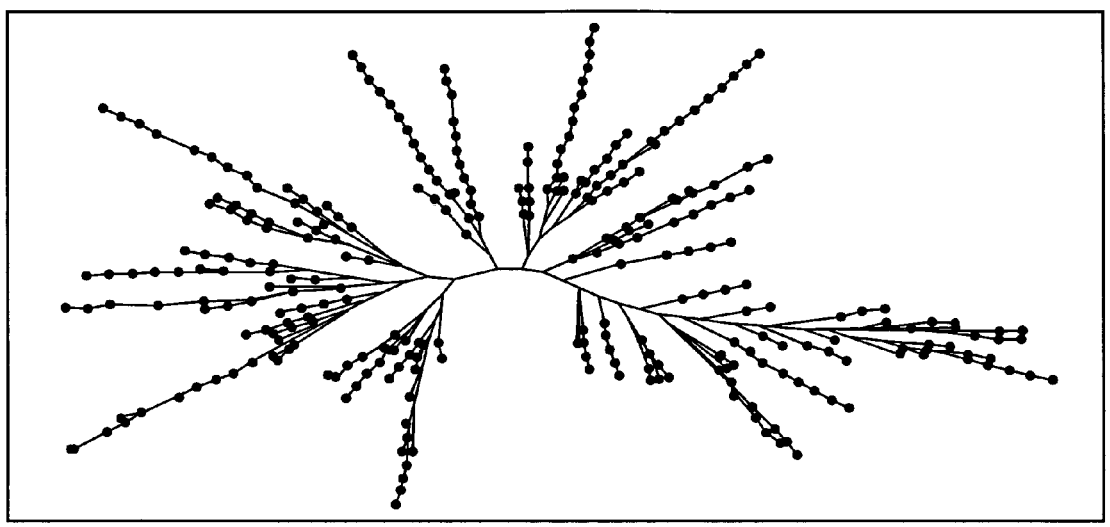
FIG. 4 is a graph of cluster analysis results produced by the invention.
Figure 5:
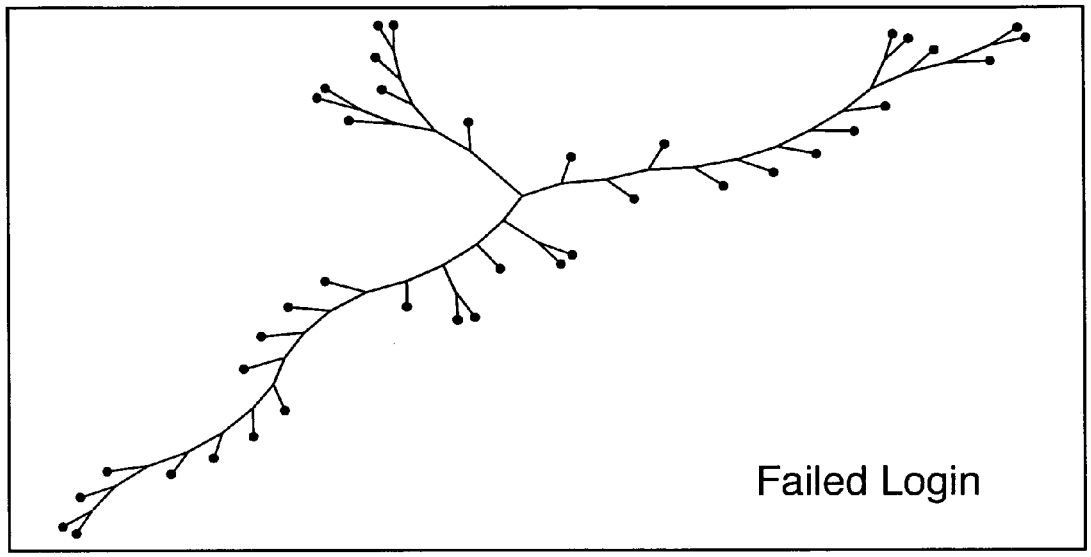
FIG. 5 is another graph of cluster analysis results produced by the invention.

FIGS. 4 and 5 are computer generated graphs of typical cluster analysis results obtained from Steps 1-8 of the present invention. FIGS. 4 and 5 illustrate the activities of a number of source IPs outside the network. Each dot represents an outside user accessing the network and having some filter triggered. The dots that are closest together are the most similar as determined by Steps 6 through 8.

FIG. 4 suggests that there may be a sophisticated user who has programmed perhaps 16 different computers to do very similar behaviors. All of the computers show up in FIG. 4 as having very similar patterns. In the case of FIG. 4, there were a total of about 788 source IP's and 800 different people coming in to the network, and the figure shows only the "failed logon" subset of that data.

FIG. 5 illustrates another "failed logon" that could be someone intentionally trying to hack in to a network. FIG. 5 shows two very long patterns associated with the computers of two scientists within the network. FIG. 5 shows a great deal of similarity in failed logons coming from a number of different countries. It appears to be a potential attack. This kind of result could not have been found without going through the method of the invention.

There are many similarities in the patterns shown in FIG. 5. The two patterns come from two different sources (IP addresses), yet they are almost identical. This suggests that the same person (source) is using two different computers to try to get at one particular scientist and what that scientist is doing. FIG. 6 shows some of the actual event data produced by the invention corresponding to the example shown in FIG. 5.

It will be understood that it is within the scope of the invention to use any of several known and available variations of vector space models, dissimilarity matrices, and clustering techniques, but all within the same overall process. The invention has been implemented using Java and Perl software. In regards to hardware requirements, any operating system and high-end desktop system can be used.

The invention claimed is:

1. A method of detecting cyber attacks upon networked targets by potential intruders comprising the steps of:
   a) organizing audit log data into event records;
   b) adding unique target identifiers to said event records;
   c) adding the type of work performed by the networked targets to said event records;
   d) sorting said event records by the IP addresses of potential intruders;
   e) generating intruder records of the potential intruders of target IP addresses that were accessed;
   f) generating a vector space model of said event records;
   g) generating a dissimilarity matrix of the data and IP addresses in said event records; and
   h) clustering event records from said dissimilarity matrix that contain a selected event.

2. The method of claim 1 wherein said unique target identifier is an employee number.

3. The method of claim 1 wherein said type of work performed by the networked target is the job classification of the networked target.

4. The method of claim 1 wherein said intruder records include at least an intruder's IP address, a list of the IP addresses that were accessed, and, for each IP address accessed, the registered owner of the IP address, the type of work the owner does, when the potential attack occurred, and the characterization of the event type.

* * * * *